(12) United States Patent
Jamba et al.

(10) Patent No.: US 10,764,198 B2
(45) Date of Patent: Sep. 1, 2020

(54) METHOD TO LIMIT PACKET FETCHING WITH UNCERTAIN PACKET SIZES TO CONTROL LINE RATE

(71) Applicant: MARVELL ASIA PTE, LTD., Singapore, OT (SG)

(72) Inventors: Nick Jamba, Lancaster, MA (US); Bhargava Narumanchi, Waltham, MA (US)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

(21) Appl. No.: 16/029,184

(22) Filed: Jul. 6, 2018

(65) Prior Publication Data

US 2020/0014630 A1    Jan. 9, 2020

(51) Int. Cl.
*H04L 12/815* (2013.01)
*H04L 12/805* (2013.01)
*H04L 12/825* (2013.01)
*H04L 12/911* (2013.01)

(52) U.S. Cl.
CPC ............ *H04L 47/365* (2013.01); *H04L 47/25* (2013.01); *H04L 47/70* (2013.01)

(58) Field of Classification Search
CPC ..... H04L 47/22; H04L 41/5025; H04L 43/10; H04L 47/24; H04L 43/0888; H04L 49/90; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/12; H04W 72/0446; H04W 72/04
See application file for complete search history.

(56) References Cited

U.S. PATENT DOCUMENTS

| | | | | |
|---|---|---|---|---|
| 2003/0076848 A1* | 4/2003 | Bremler-Barr | .......... | H04L 29/06 370/412 |
| 2005/0175014 A1* | 8/2005 | Patrick | .................... | H04L 47/10 370/395.43 |
| 2008/0008095 A1* | 1/2008 | Gilfix | ...................... | H04L 47/10 370/235 |
| 2008/0159135 A1* | 7/2008 | Caram | .................... | H04L 47/10 370/230 |
| 2012/0092993 A1* | 4/2012 | Kan | ........................ | H04L 47/12 370/235 |
| 2013/0322255 A1* | 12/2013 | Dillon | .................... | H04L 47/22 370/236 |

(Continued)

OTHER PUBLICATIONS https://en.wikipedia.org/wiki/Network_scheduler [Retrieved Jun. 21, 2018]; 5 pages.

*Primary Examiner* — Jung Liu
(74) *Attorney, Agent, or Firm* — Hamilton, Brook, Smith & Reynolds, P.C.

(57) ABSTRACT

In an embodiment, a method comprises, loading, from at least one source of packets to a memory, a packet based on a network scheduler indicating availability of bandwidth from the at least one source of packets to the memory that is at least the average size of packets. The method further includes updating the average size of the packets based on a size of the loaded packet. The method further includes reconciling the availability of bandwidth indicated by the network scheduler based on the size of the loaded packet.

20 Claims, 7 Drawing Sheets

(56) References Cited

U.S. PATENT DOCUMENTS

2015/0016266 A1\* 1/2015 Dumitrescu .......... H04L 47/623
                                                    370/236
2016/0044695 A1\* 2/2016 Gunner ................. H04L 49/90
                                                    370/336

\* cited by examiner

Table 1

| KEY | ROW/BLK | BW | BW/Slice |
|---|---|---|---|
| 0 | CTL | | NA |
| 1 | DAT | | |
| 2 | DAT | 10 Gbps | 0 |
| 3 | DAT | | |
| 4 | CTL | | NA |
| 5 | DAT | 2 Gbps | 1 |
| 6 | DAT | 3 Gbps | 2 |
| 7 | DAT | 5 Gbps | 3 |

Table 2

| | | | | |
|---|---|---|---|---|
| SAVE_ROUTINE(?) | 1 | 1 | 1 | 1 |
| SAVE_ROUTINE_REPLY(?) | 1250 | 250 | 375 | 625 |
| BAD SAVE_ROUTINE_MAX_TOKENS | 65535 | 65535 | 65535 | 65535 |
| SAVE_ROUTINE_MAP | 256 | 128 | 512 | 64 |
| SAVE_ROUTINE_END(?) | 7 | 7 | 7 | 7 |

METHOD TO LIMIT PACKET FETCHING WITH UNCERTAIN PACKET SIZES TO CONTROL LINE RATE

BACKGROUND

Processors, and specifically network processors, route packets to and from destinations on a network. In doing so, the processors can perform direct memory access of packets. Certain processors can route the packets to various internal, and in some cases external, functions.

SUMMARY

In an embodiment, a method comprises, loading, from at least one source of packets to a memory, a packet based on a network scheduler indicating availability of bandwidth from the at least one source of packets to the memory that is at least the average size of packets. The method further includes updating the average size of the packets based on a size of the loaded packet. The method further includes reconciling the availability of bandwidth indicated by the network scheduler based on the size of the loaded packet.

In an embodiment, the method further includes sending the loaded packet to a destination address in the memory.

In an embodiment, the network scheduler is a token bucket. Reconciling the availability of bandwidth may include reconciling a number of tokens available in the token bucket.

In an embodiment, the network scheduler is a packet rate limiter.

In an embodiment, the average size is determined by a weighted old average and a weighted amount of the loaded packet. In an embodiment, a sum of the weight of the old average and the weight of the loaded packet is one.

In an embodiment, the packet flow is a packet flow of a virtual function (VF) ring. A plurality of the VF rings can be assigned to a particular network scheduler. The method can further include marking, upon the network scheduler indicating no available bandwidth from the at least one source of packets to the memory, a last of the plurality of VF rings to send a packet in an order of the VF rings. The method can also include, upon the network scheduler indicating available bandwidth from the at least one source of packets to the memory, selecting a next VF ring after the last VF ring in the order of the VF rings.

In an embodiment, packet flow is the distribution of packets from a first node to a destination, optionally via intermediary nodes. Nodes along the packet flow from the first node to a node before the destination can be considered upstream from the destination in the packet flow. Backpressure is applied from the destination upstream in the packet flow.

In an embodiment, the memory can be a memory buffer of the VF ring.

In an embodiment, the method can further include, from the at least one source of packets to the memory, as determined by the network scheduler, loading a second packet based on the network scheduler indicating availability of bandwidth from the at least one source of packets to the memory that is at least the average size of packets. The method can further include updating the average size of the packets based on a size of the loaded second packet. The method can further include reconciling the availability of bandwidth indicated by the network scheduler based on the size of the loaded second packet.

In an embodiment, a system can include a processor configured to implement a network scheduler. The network scheduler can be configured to load, from at least one source of packets to a memory, a packet based on the network scheduler indicating availability of bandwidth from the at least one source of packets to the memory that is at least the average size of packets. The network scheduler can further be configured to update the average size of the packets based on a size of the loaded packet. The network scheduler can further be configured to reconcile the availability of bandwidth indicated by the network scheduler based on the size of the loaded packet.

BRIEF DESCRIPTION OF THE DRAWINGS

FIGS. 4A-B are tables that illustrate, respectively, configurations of systems employed by the present disclosure.

DETAILED DESCRIPTION

A description of example embodiments follows.

Figure 1A:
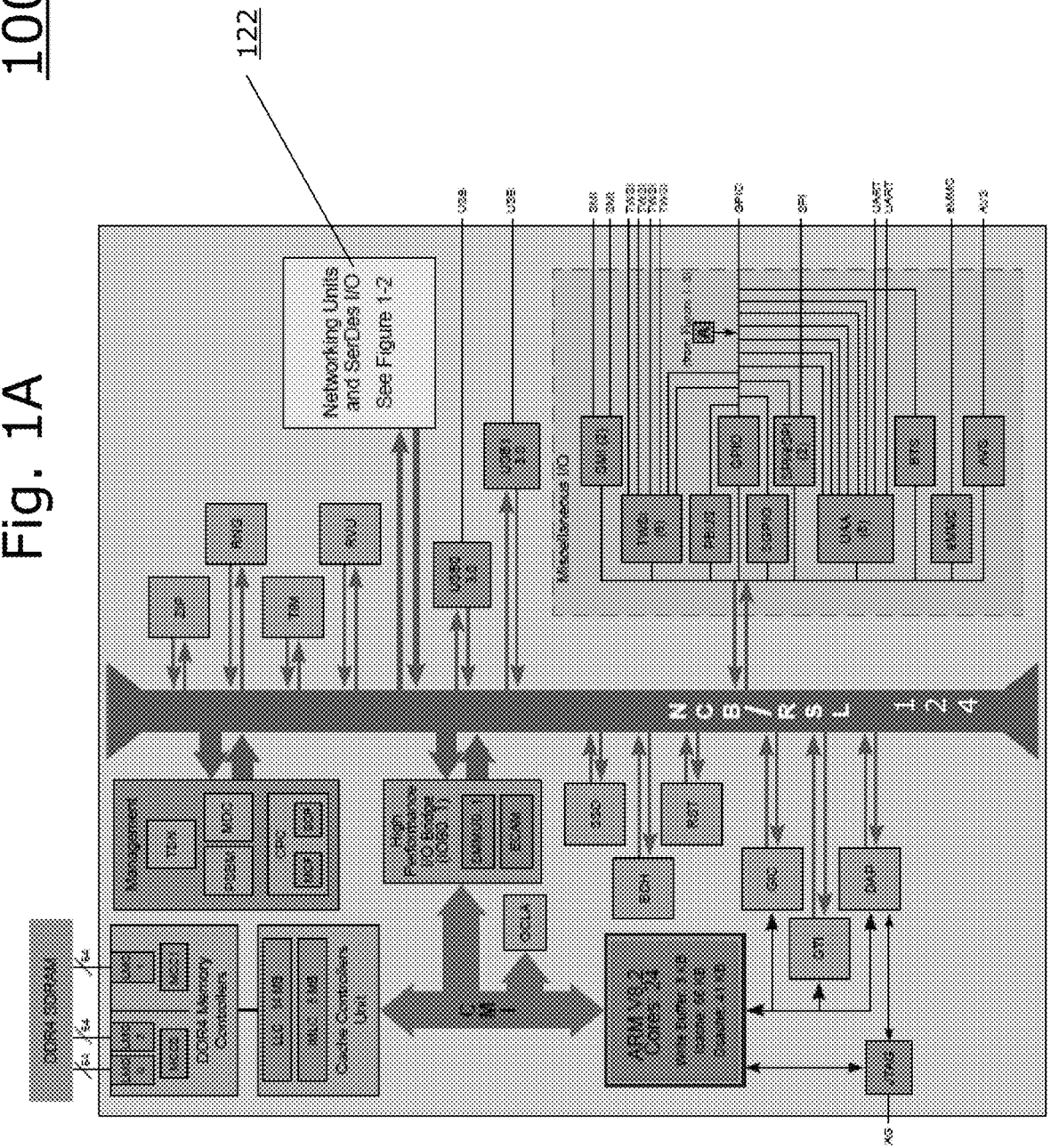
FIG. 1A is a block diagram illustrating a network processor employing a networking units block.

FIG. 1A is a block diagram illustrating a network processor employing a networking units block 122. The networking units block 122 is connected to a Near-Coprocessor Bus (NCB), which facilitates communication with other portions of the chip, including memory and memory controllers, and other modules.

Figure 1B:
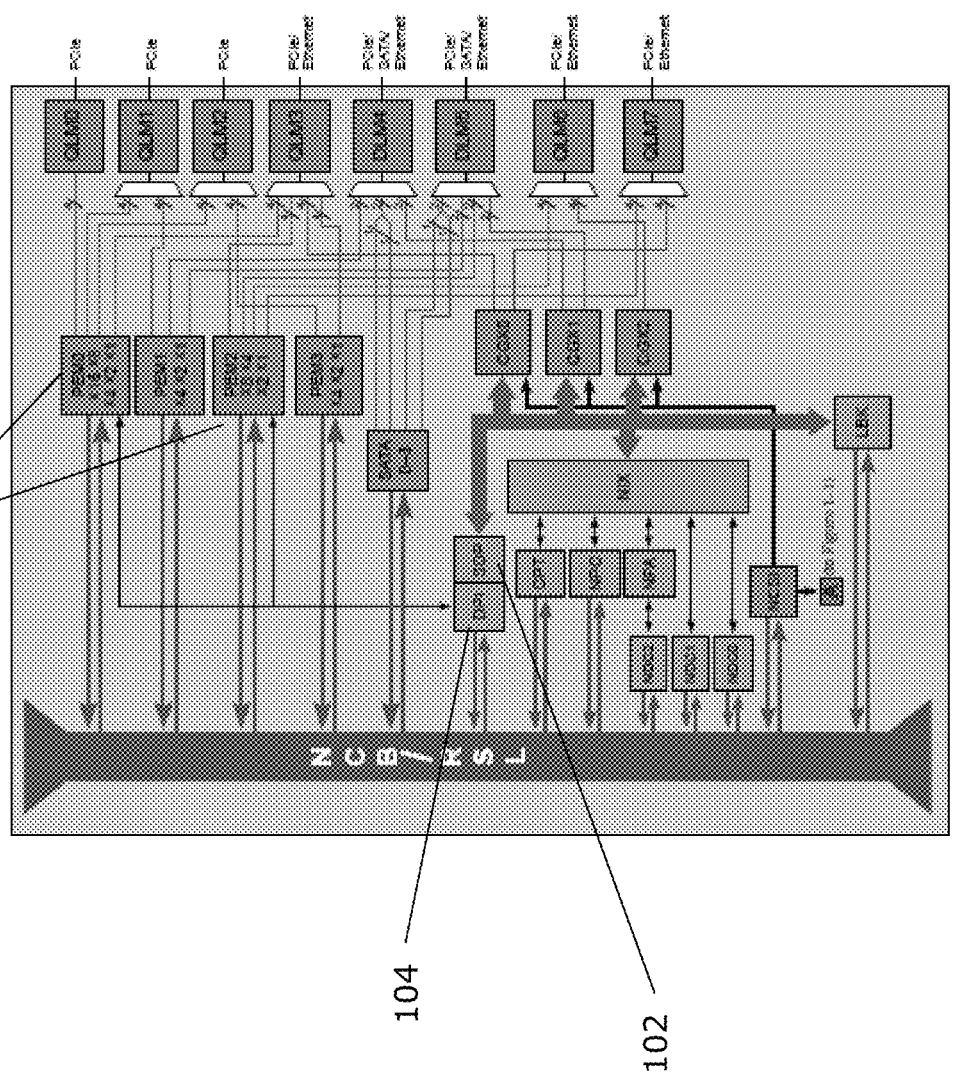
FIG. 1B is a block diagram illustrating an example embodiment of elements within the networking units block and their connections to the NCB.

FIG. 1B is a block diagram 120 illustrating an example embodiment of elements within the networking units block 122 and their connections to the NCB. The System Deep Packet Inspection (DPI) Packet (SDP) Interface Unit 102 is coupled with a Deep Packet Inspection (DPI) unit 104. The DPI unit is coupled with the PCI-Express Interface Units (PEM) 114 to receive information from PCI-Express. The SDP 102 can further communicate with a Network Interface Controller (NIX) that exchanges packets with PCIe/SATA/Ethernet.

Figure 1C:
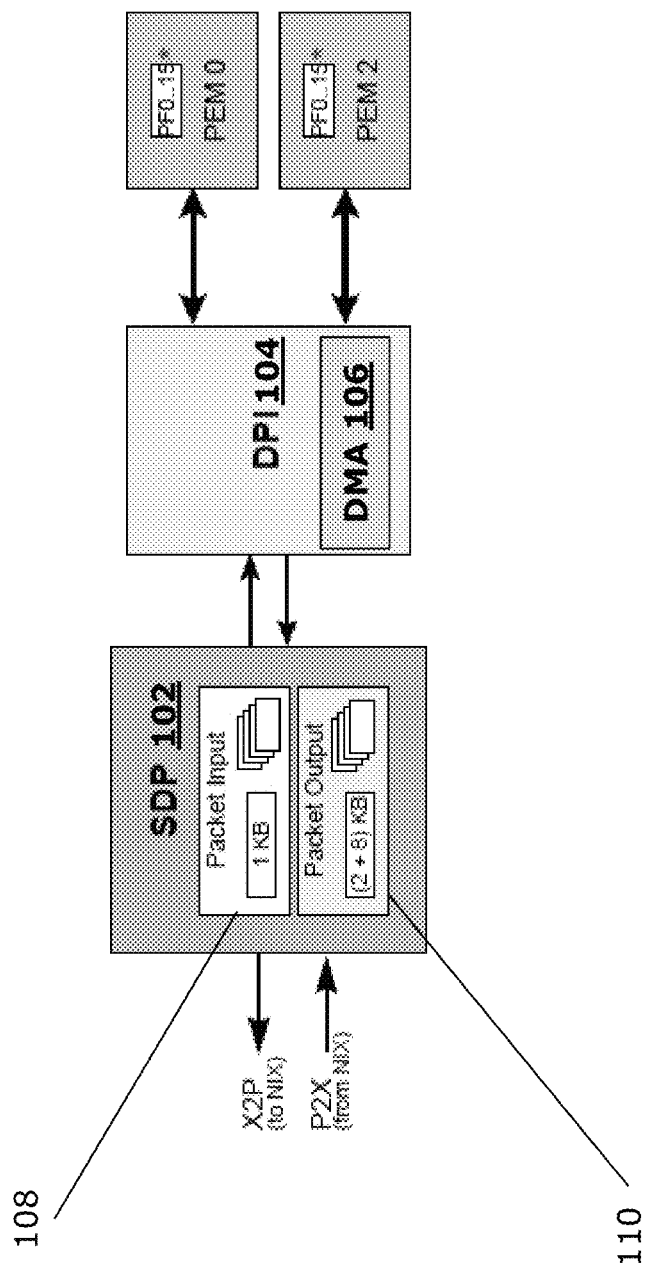
FIG. 1C is a block diagram illustrating an example embodiment of a System Deep Packet Inspection (DPI) Packet (SDP) Interface Unit, Deep Packet Inspection Unit, and PCI-Express Interface Unit (PEM) unit.

FIG. 1C is a block diagram 130 illustrating an example embodiment of a System Deep Packet Inspection (DPI) Packet (SDP) Interface Unit, Deep Packet Inspection Unit, and PEM unit. The SDP 102 interface unit provides PCIe Endpoint support for a remote host to DMA packets into and out of a hardware processor. The SDP 102 includes a packet input unit (PKI) 108 and a packet output unit (PKO) 110. The SDP 102 communicates with a deep packet inspection (DPI) unit 104 having a direct memory access (DMA unit 106. The DPI unit 104 further communicates with PEM units, for example, having virtual functions (VFs) and physical functions (PFs).

The SDP 102 has 256 physical SDP input rings that are paired with SDP output rings. A PCIe host or other external device may submit instructions/packets to the SDP 102, which is a way to feed packets or commands to the chip on which the SDP resides.

The SDP 102 can further stop instruction fetches for a physical ring when buffer counts are low. The SDP 102 does not fetch new instructions for a physical ring when the network interface controller (NIX) is exerting backpressure for its respective pair.

In an embodiment of the present disclosure, a hardware-based rate limiter is designed to control the bandwidth on a packet ingress unit that fetches packets having unknown length and protocol. Rate limiting is applied such that the system accommodates the packet in the hardware without dropping the packet, while maintaining the bandwidth per flow within a configurable specified limit.

In an embodiment, an average packet size parameter is tracked per packet flow/path because the ingress system has no prior knowledge of the size of packets that need to be fetched. In other words, the request to fetch the packet does not include the packet length, but rather includes a pointer to the packet in memory. When the fetch request is issued, the system subtracts this average packet size parameter from the total accumulated credits per flow of the network scheduler. When packet (or packet header with length information) arrives at the PKI of the SDP 102, the actual length of the packet is determined and reconciled with the assumed packet length (e.g., the average length of the packet) at fetch time and the credits per flow are updated accordingly. After fetching the packet data, it is sent to the PKI of the SDP 102.

Maintaining an adjustable average packet size allows for all fetched packets to be processed without congesting the system with packets from any one particular packet flow with low hardware and latency cost.

Figure 2:
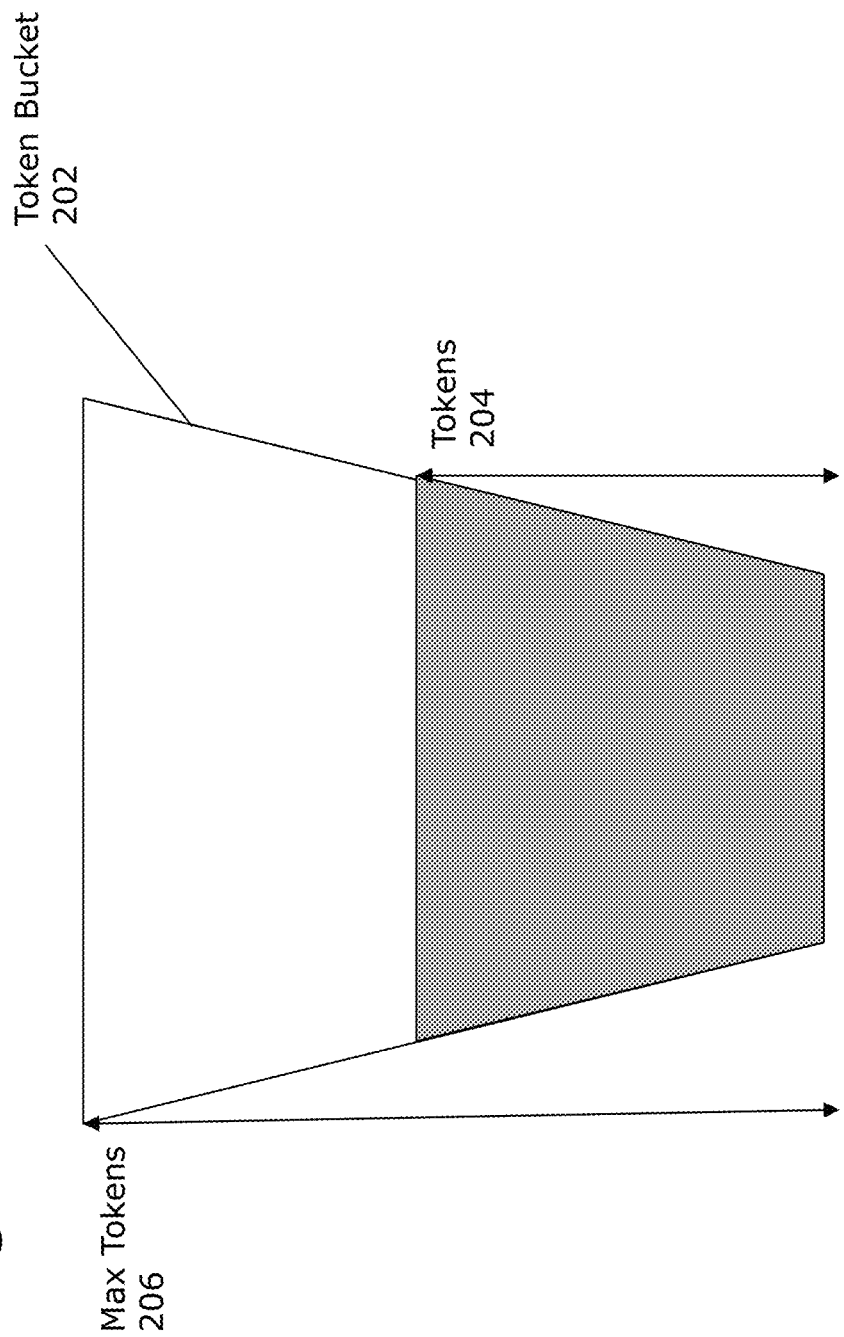
FIG. 2 is a diagram of an example embodiment of a token bucket.

FIG. 2 is a diagram 200 of an example embodiment of a token bucket 202. The token bucket 202 is an example of network scheduler or packet rate limiter. A person having ordinary skill in the art can recognize other network schedulers can be employed in embodiments of the present disclosure, including an adaptive virtual queue (AVQ), class-based queuing (CBQ), Choose and Keep/Choose and Kill (CHOKe), controlled delay (CoDel), Credit-based fair queuing, deficit round robin (DRR), FavourQueue (FaQ), generic cell rate algorithm (GCRA), heavy-hitter filter (HFF), hierarchical fair-service curve (HFSC), hierarchical token bucket (HTB), QFQ (quick fair queueing), fair queuing (FQ), weighted fair queuing (WFQ), first-in, first-out (FIFO), fair queue packet scheduler, network emulator (NETEM), proportional integral controller enhanced (PIE), random early detection (RED), round-robin (RR), weighted round-robin (WRR), stochastic fair blue (SFB), stochastic fairness queueing (STQ), token bucket filter (TBF) and trivial link equalizer (TEQL).

The token bucket 202 is configured to have a max token value 206. The token bucket 202 is further assigned to one or more network traffic flows. Every time a packet is transferred along one of the network traffic flows, a number of tokens are removed from the token bucket 202. The number of tokens are determined at least by the size of the packet, with a bigger size generally correlating with more tokens being required. The tokens 204 can be replenished based on a variety of factors, such as time or clock cycles elapsing.

In a traditional token bucket 202, an adequate number of tokens 204 must be present to allow the network transfer of a particular size to proceed. In other words, the number of tokens 204 in the token bucket 202 must be greater than or equal to the number of tokens required to transfer the packet.

Figure 3:
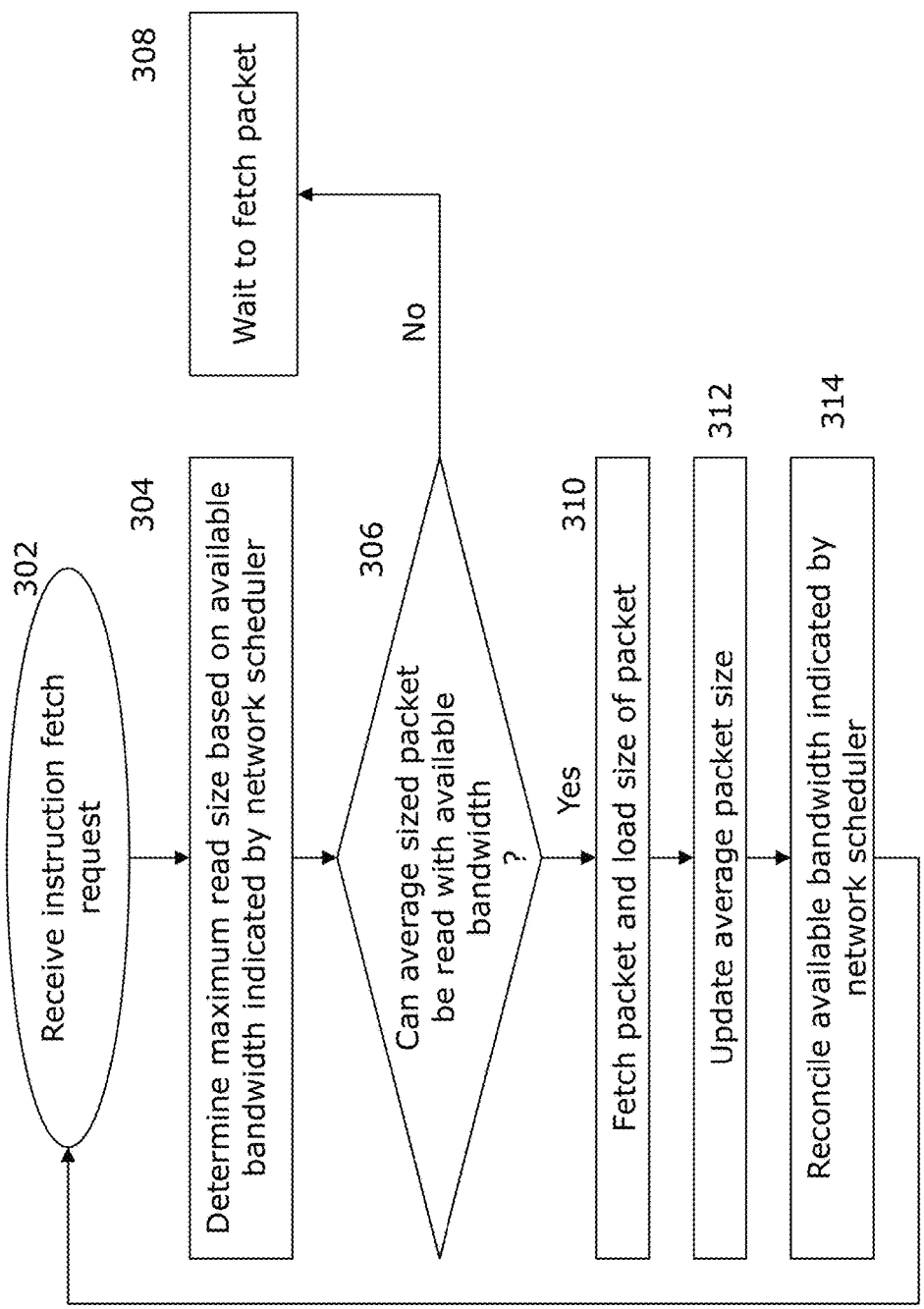
FIG. 3 is a flow diagram illustrating an example embodiment of the present disclosure employing network schedulers.

FIG. 3 is a flow diagram 300 illustrating an example embodiment of the present disclosure employing network schedulers. After receiving an instruction (or packet) fetch request, (302), the method determines a maximum read size based on the available bandwidth indicated by a network scheduler (304). In other words, the network scheduler is queried to determine how much bandwidth is available for the given packet flow to which it is assigned.

Then, the method determines whether an average packet sized packet be read given available bandwidth indicated by the network scheduler (306). The average packet size is used because the size of the packet to be fetched is unknown until the packet is fetched. Therefore, using the average size can be a good predictor and prevent wasteful pre-fetches of packets.

If the average sized packet cannot be read with the available bandwidth (306), the method waits to fetch the packet (308). If the average sized packet can be read with the available bandwidth (306), the method fetches the packet and loads the size of the packet (310). The method then updates the average packet size given the loaded size of the new packet (312). The method then reconciles the available bandwidth indicated by the network scheduler (314). The reconciliation can include reducing the number of tokens in the token bucket based on the size of the packet, if the network scheduler is a token bucket. After reconciliation, the method can then receive another instruction fetch request (302).

As per the above, a person having ordinary skill in the art can recognize that the present disclosure solves problems of bandwidth management within processors, network processors, and network devices. The present disclosure solves these problems by allowing, on one or more bandwidth channels, management of packets before the packets are fetched. This improves the performance of the processor by preventing wasted clock cycles being used to pre-fetch a packet that is never sent, as one example, while delivering enhanced performance by allocating bandwidth according to the configuration of the network scheduler.

FIGS. 4A-B are tables 400 and 420 that illustrate, respectively, configurations of systems employed by the present disclosure. Table 1 illustrates a configuration of two Virtual Functions (VFs), VF 1 and VF 0 that are respectfully assigned four rings (e.g., memory buffers) 0-3 and 4-7. Table 1 further illustrates whether each ring is configured to be control (CTL) or data (DAT) and bandwidth limitations. Rings 1-3 are configured to share 10 gigabits per second (Gbps) with network scheduler (e.g., bucket) 0, ring 5 is configured to be allocated 2 Gbps via network scheduler 1, ring 6 is configured to be allocated 3 Gbps via network scheduler 2, and ring 7 is configured to be allocated 5 Gbps via network scheduler 3.

Table 2 illustrates various settings to enable the four buckets 0-3, rate limit as set by reference tokens, max tokens, and the initial average packet size. The weight value is used to calculate the average packet size as the system operates.

Host software creates the packets to be processed by the PKI 108. The host software writes instructions to the instruction queues in host memory and notifies PKI 108 of the addition of instructions to the rings by doorbell writes to the SDP 102. The PKI 108 maintains the following information about each ring:

a) A configured base address for the ring, b) A configured ring size, and c) A tail pointer, which gives an approximate view of the tail.

Based on an instruction size from the CSR, an enable state of the ports, and a doorbell count, Instruction Fetch (IF) logic of the SDP 102 (e.g., the PKI unit) arbitrates on a round-robin basis to service ports having outstanding packets. The IF logic issues a DMA request (e.g., via DMA 106 of FIG. 1) to retrieve instructions based on the base address, offset pointer. The IF logic attempts to retrieve up to maximum size instructions at a time if enough entries are available in the ring, otherwise it requests one at a time. The logic continues to process the enabled ports on a continual basis unless buffers are too full to continue or until the network scheduler indicate bandwidth is no longer available.

Once the IF logic fetches instructions from the host memory (e.g., via PCI Express or other ports), the instructions are stored in the instruction processing (IP) block of the SDP, which starts executing the instructions and issuing packet reads. Since the data size to be fetched per instruction can range from 40B to 64 KB, this large range introduces the possibility of one ring having large packet data fetches capturing the entire bandwidth of the bus. Such a scenario can cause starvation among other rings.

To clarify, instructions are usually either 32B or 64B by themselves, but the instructions can contain data pointers which retrieve data that can ranging from 40B to 64 KB. For example, consider a simulation with the following configuration:

a) Ring 0 (pink): Two bursts of large data packet instructions fetches between Internet Mix (IMIX) traffic.
b) Ring 1-7: IMIX traffic instruction fetches.

In this example, packets from Ring 0's instruction fetches captures the PCI Express bandwidth. As long as Ring 0 issues instruction fetches having large data packets, Ring 0 captures the majority of the bandwidth and causes starvation among the other rings, which is undesirable. Therefore, there is a need to limit bandwidth utilization among rings to improve performance of the processor.

To implement bandwidth fairness among rings, the SDP implements network schedulers (e.g., token buckets) while arbitrating among active rings to issue instruction fetches. In an embodiment, the SDP implements 256 network schedulers (e.g., token buckets). Active rings to be rate limited are mapped to these buckets to achieve rate limiting. Multiple rings can be mapped to one bucket. Each bucket has the following properties:

a) TOKENS: a finite number of tokens which represents the number of bytes of bandwidth a ring can use in a 1024 cycle period,
b) AVG_PKT_SIZE: the average packet size which is a moving average of the data packet sizes per instruction issued,
c) MAX_RD_SIZE: the maximum read size based on the available tokens and average packet size,
d) MAX_TOKENS: the maximum number of tokens to which each bucket can saturate.

A person having ordinary skill in the art can recognize that the property names and numbers used herein can be adjusted to configure or optimize the system for different environments and scenarios.

Initializing the token buckets includes initializing the following values:

a) RATE_LIMIT[ENABLE]: Turns on token bucket for each bucket
b) RATE_LIMIT[REF TOKENS][[15:0]: Number of tokens to add every 1024 cycles
c) RATE_LIMITE[MAX_TOKENS][15:0]: max tokens of bytes in token bucket
d) RATE_LIMIT[INIT_AP][15:0]: Initial average packet size
e) RATE_LIMIT[WGT][3:0]: Weight to calculate the moving average packet size.

During every arbitration round, each bucket has an active field which informs the arbiter whether that bucket has enough tokens to issue an instruction fetch. The arbiter selects among rings with buckets that have sufficient tokens, in a round robin fashion. The instruction fetch attempts to issue MAX_RD_SIZE instructions, but the fetch logic also has other restrictions such as alignment, available buffer space, doorbell count, etc., which drive the actual fetch size. The instruction fetch attempt does not exceed max_rd_size with respect to the size of the average packet size. In an example, max_rd_size can be calculated based on the below function:

$$\circ \text{max\_rd\_size} = \begin{cases} 1, & 0 < (\text{TOKENS}/\text{AVG\_PKT\_SIZE}) < 2 \\ 2, & 2 \leq (\text{TOKENS}/\text{AVG\_PKT\_SIZE}) < 4 \\ 4, & 4 \leq (\text{TOKENS}/\text{AVG\_PKT\_SIZE}) < 8 \\ 8, & (\text{TOKENS}/\text{AVG\_PKT\_SIZE}) \geq 8 \end{cases}$$

The number of tokens used for that bucket are then updated based on the issued read size.

tokens=MIN(MAX_TOKENS,(tokens−issued_rd_size*(avg_pkt_size))

MAX_TOKENS is configured accordingly to be larger than any max anticipated packet size (e.g., greater than 64 KB+64B, the largest possible sizes of data pointed to by the instruction and the instruction itself, respectively).

avg_pkt_size (aps) for this arbitration round is saved as pkt_sizeissue.

For a given cycle period (e.g., every 1024 cycles), REF TOKENS are added to each bucket. When the instruction processing unit receives the issued instruction data, the number of tokens for that bucket are adjusted based on the difference in received packet size, pkt_sizercvd and issued packet size, pkt_sizeissue.

tokens=MIN(MAX_TOKENS,tokens−(pkt_sizercvd−pkt_sizeissue))

At this time, the average packet size is also updated per bucket. RATE_LIMIT[WGT] with range of 0→8, specifies the power of 2 weights between 0→256.

$$aps_{new} = \begin{cases} aps, & wgt = 0 \\ (aps*(256-2^{wgt}) + \text{pkt\_size}*2^{wgt})/256, & 1 < wgt \leq 7 \\ \text{pkt\_size}, & wgt \geq 8 \end{cases}$$

There are two sets of registers that software writes to enforce rate limiting. A map ring register is a per ring register that maps the ring to an assigned bucket and enables rate limiting based on the parameters of the assigned bucket. A rate limit register is a per bucket register that configures the initial parameters for rate limiting. Apart from mapping the rings, the associated bucket also are configured to achieve rate limiting for rings. Buckets that have the RATE_LIMIT[ENABLE] cleared employ the old scheme for max_rd_size, that is they are driven by IN_CONTROL [RD_SIZE].

Instruction fetch responses that return with an error are ignored and do not update tokens and average packet size. Once a ring responds with an error on instruction fetch, the ring should be reset and follows a set of state clearing steps. If the ring reset is managed by a VF, then rate limiting configuration does not change and continues to apply after the reset of the ring. If the ring reset is managed by a PF or AP then rate limiting configuration can be changed before completing the ring reset. Again, as described above, both these registers should be edited in unison, and software should be aware of the current configuration state and ensure it does not step over another PF's rate limiting registers.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   issuing a request to load an ingress packet, the request including a memory reference to the ingress packet loaded from at least one source of ingress packets, the ingress packet having an unknown size prior to being loaded, the request based on a network scheduler indicating availability of bandwidth from the at least one source of ingress packets, the availability being based on at least the average size of packets received by the source of ingress packets prior to issuing the request;
   responsive to loading the ingress packet, retrieving a size of the ingress packet;
   updating the average size of the ingress packets based on a size of the ingress packet loaded; and
   reconciling the availability of bandwidth indicated by the network scheduler based on the size of the ingress packet loaded.

2. The method of claim 1 further comprising sending the ingress packet loaded to a destination address in the memory.

3. The method of claim 1, wherein:
   the network scheduler is a token bucket, and
   reconciling the availability of bandwidth includes reconciling a number of tokens available in the token bucket.

4. The method of claim 1, wherein the network scheduler is a packet rate limiter.

5. The method of claim 1, wherein the average size is determined by a weighted old average and a weighted amount of the ingress packet loaded.

6. The method of claim 5, wherein a sum of the weight of the old average and the weight of the ingress packet loaded is one.

7. The method of claim 1, wherein the at least one source of packets is a packet flow of a virtual function (VF) ring.

8. The method of claim 7, wherein a plurality of the VF rings is assigned to a particular network scheduler, and further comprising:
   marking, upon the network scheduler indicating no available bandwidth from the at least one source of ingress packets to the memory, a last of the plurality of VF rings to send a packet in an order of the VF rings;
   upon the network scheduler indicating available bandwidth from the at least one source of ingress packets to the memory, selecting a next VF ring after the last VF ring in the order of the VF rings.

9. The method of claim 7, wherein the memory is a memory buffer of the VF ring.

10. The method of claim 1, further comprising:
    loading, from the at least one source of ingress packets to the memory, a second packet based on the network scheduler indicating availability of bandwidth from the at least one source of ingress packets to the memory that is at least the average size of the ingress packets;
    updating the average size of the ingress packets based on a size of the loaded second ingress packet; and
    reconciling the availability of bandwidth indicated by the network scheduler based on the size of the loaded second ingress packet.

11. A system comprising:
    a processor configured to implement a network scheduler, the network scheduler configured to:
    issue a request to load an ingress packet, the request including a memory reference to the ingress packet loaded from at least one source of ingress packets, the ingress packet having an unknown size prior to being loaded, the request based on the network scheduler indicating availability of bandwidth from the at least one source of ingress packets, the availability being based on at least the average size of packets received by the source of ingress packets prior to issuing the request;
    responsive to loading the ingress packet, retrieving a size of the ingress packet;
    update the average size of the ingress packets based on a size of the ingress packet loaded; and
    reconcile the availability of bandwidth indicated by the network scheduler based on the size of the ingress packet loaded.

12. The system of claim 11 wherein the processor is further configured to send the ingress packet loaded to a destination address in the memory.

13. The system of claim 11, wherein:
    the network scheduler is a token bucket, and
    the processor is further configured to reconcile the availability of bandwidth includes reconciling a number of tokens available in the token bucket.

14. The system of claim 11, wherein the network scheduler is a packet rate limiter.

15. The system of claim 11 wherein the average size is determined by a weighted old average and a weighted amount of the ingress packet loaded.

16. The system of claim 15, wherein a sum of the weight of the old average and the weight of the ingress packet loaded is one.

17. The system of claim 11, wherein the plurality of packets is a packet flow of a virtual function (VF) ring.

18. The system of claim 17, wherein a plurality of the VF rings is assigned to a particular network scheduler, and the processor is further configured to:
    mark, upon the network scheduler indicating no available bandwidth from the at least one source of ingress packets to the memory, a last of the plurality of VF rings to send a packet in an order of the VF rings;
    upon the network scheduler indicating available bandwidth from the at least one source of ingress packets to the memory, select a next VF ring after the last VF ring in the order of the VF rings.

19. The system of claim 17, wherein the memory is a memory buffer of the VF ring.

20. The system of claim 11, wherein the processor is further configured to:
    load, from the at least one source of packets to the memory, a second ingress packet based on the network scheduler indicating availability of bandwidth from the at least one source of ingress packets to the memory that is at least the average size of packets;
update the average size of the ingress packets based on a size of the loaded second ingress packet; and
reconcile the availability of bandwidth indicated by the network scheduler based on the size of the loaded second ingress packet.

\* \* \* \* \*

UNITED STATES PATENT AND TRADEMARK OFFICE
CERTIFICATE OF CORRECTION

PATENT NO. : 10,764,198 B2
APPLICATION NO. : 16/029184
DATED : September 1, 2020
INVENTOR(S) : Jamba et al.

It is certified that error appears in the above-identified patent and that said Letters Patent is hereby corrected as shown below:

On the Title Page

Item (71), under "Applicant", delete "Singapore, OT (SG)" and insert -- Singapore, (SG) --, therefor.

In the Specification

In Column 2, Line 52, delete "(NIX)" and insert -- (NIC) --, therefor.

In Column 2, Line 62, delete "(DMA" and insert -- (DMA) --, therefor.

In Column 3, Line 7, delete "(NIX)" and insert -- (NIC) --, therefor.

In Column 3, Line 44, delete "(HFF)," and insert -- (HHF), --, therefor.

In Column 3, Lines 45-46, delete "queining" and insert -- queueing --, therefor.

In Column 3, Line 51, delete "(STQ)," and insert -- (SFQ), --, therefor.

In Column 4, Line 10, delete "be" and insert -- can be --, therefor.

In Column 5, Line 25, delete "ranging" and insert -- be ranging --, therefor.

In Column 5, Line 64, delete "[REF TOKENS]" and insert -- [REF_TOKENS] --, therefor.

In Column 5, Line 64, delete "[[15:0]:" and insert -- [15:0]: --, therefor.

In Column 6, Line 28, delete "(avg_pkt_size))" and insert -- (avg_pkt_size))) --, therefor.

Signed and Sealed this
Thirtieth Day of April, 2024

Katherine Kelly Vidal
*Director of the United States Patent and Trademark Office*